(12) United States Patent
Takahashi

(10) Patent No.: US 8,531,690 B2
(45) Date of Patent: Sep. 10, 2013

(54) LINKAGE SYSTEM OF PLURAL MULTI FUNCTION PERIPHERALS

(75) Inventor: Toshiharu Takahashi, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/986,380

(22) Filed: Jan. 7, 2011

(65) Prior Publication Data
US 2011/0170128 A1 Jul. 14, 2011

Related U.S. Application Data

(60) Provisional application No. 61/294,157, filed on Jan. 12, 2010.

(51) Int. Cl.
*G06F 3/12* (2006.01)
*H04N 1/40* (2006.01)

(52) U.S. Cl.
USPC .......................................... 358/1.13; 358/1.15

(58) Field of Classification Search
USPC .............. 358/1.1, 1.13, 1.14, 1.15, 1.18, 407, 358/409, 426, 428, 468, 500; 382/100, 182, 382/305; 707/104, 200, 205, 500; 709/202, 709/203, 209, 231, 232
See application file for complete search history.

(56) References Cited

U.S. PATENT DOCUMENTS

| | | | |
|---|---|---|---|
| 5,673,373 A | 9/1997 | Nosaki et al. | |
| 6,119,132 A * | 9/2000 | Kuwano | 1/1 |
| 8,213,036 B2 * | 7/2012 | Ishii | 358/1.15 |
| 2006/0050310 A1 | 3/2006 | Ito | |

OTHER PUBLICATIONS

Chinese Office Action for Chinese Application No. 2011100053147 mailed on Mar. 29, 2013.

* cited by examiner

*Primary Examiner* — Gabriel Garcia
(74) *Attorney, Agent, or Firm* — Turocy & Watson, LLP

(57) ABSTRACT

According to an embodiment, a linkage system of plural multi function peripherals includes a first multi function peripheral and a second multi function peripheral. The first multi function peripheral includes a first network interface, a first memory and a first management unit. The first memory is configured to store a first data group. The first management unit is configured to manage first management information relating to the first data group. The second multi function peripheral includes a second network interface, a second memory, a second management unit and a control unit. The second memory is configured to store a second data group. The second management unit is configured to manage second management information relating to the second data group. The control unit is configured to link the first management information and the second management information.

6 Claims, 5 Drawing Sheets

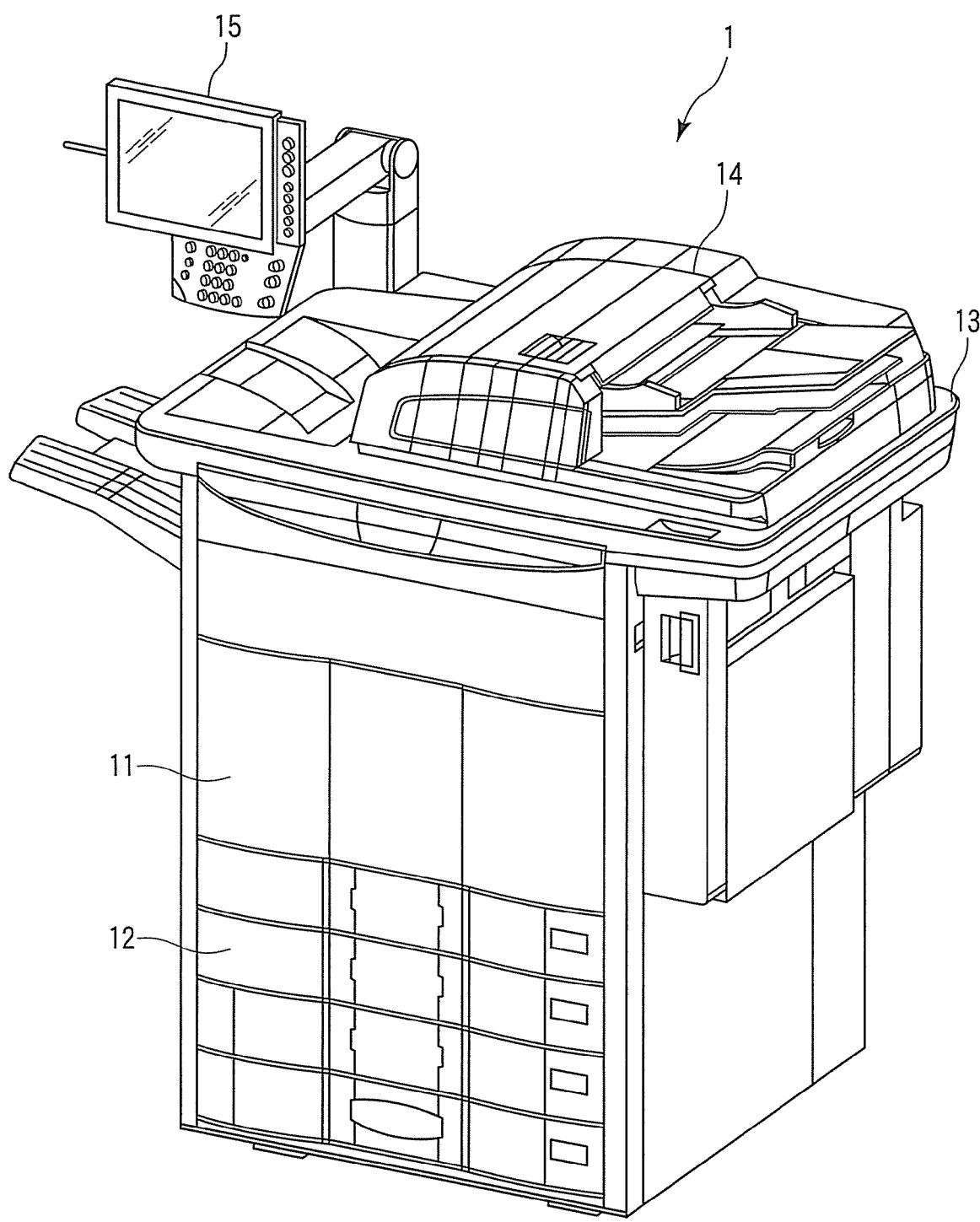
F I G. 1

LINKAGE SYSTEM OF PLURAL MULTI FUNCTION PERIPHERALS

CROSS-REFERENCE TO RELATED APPLICATION

This application is based upon and claims the benefit of priority from Provisional Application No. 61/294,157, filed on Jan. 12, 2010, the entire contents of which are incorporated herein by reference.

FIELD

Embodiments described herein relate generally to a technique to link plural multi function peripherals.

BACKGROUND

Hitherto, in an office, plural multi function peripherals (hereinafter referred to as MFPs) and plural PCs are connected through a network so that data communication can be mutually performed. When a shared server is not connected on the network, although each of the MFPs manages a document (address book, data such as image, etc.) registered in its own MFP, the MFP can not manage a document registered in another MFP on the network. That is, the respective MFPs can not share documents registered in the respective MFPs on the network.

A user can access a document registered in an MFP by operating a control panel of the specific MFP or by operating a PC for the MFP through the network.

However, the user can not access a document registered in another MFP by operating the control panel of the specific MFP or by operating the PC for the MFP through the network.

Accordingly, when documents are registered in plural separate MFPs on the network, the user access a document by operating a control panel of an MFP in which the document desired to be accessed is registered or by specifying the MFP by a PC through the network.

BRIEF DESCRIPTION OF THE DRAWINGS

FIG. 1 is an exemplary view showing an outer appearance of an MFP in an embodiment.

DETAILED DESCRIPTION

Figure 2:
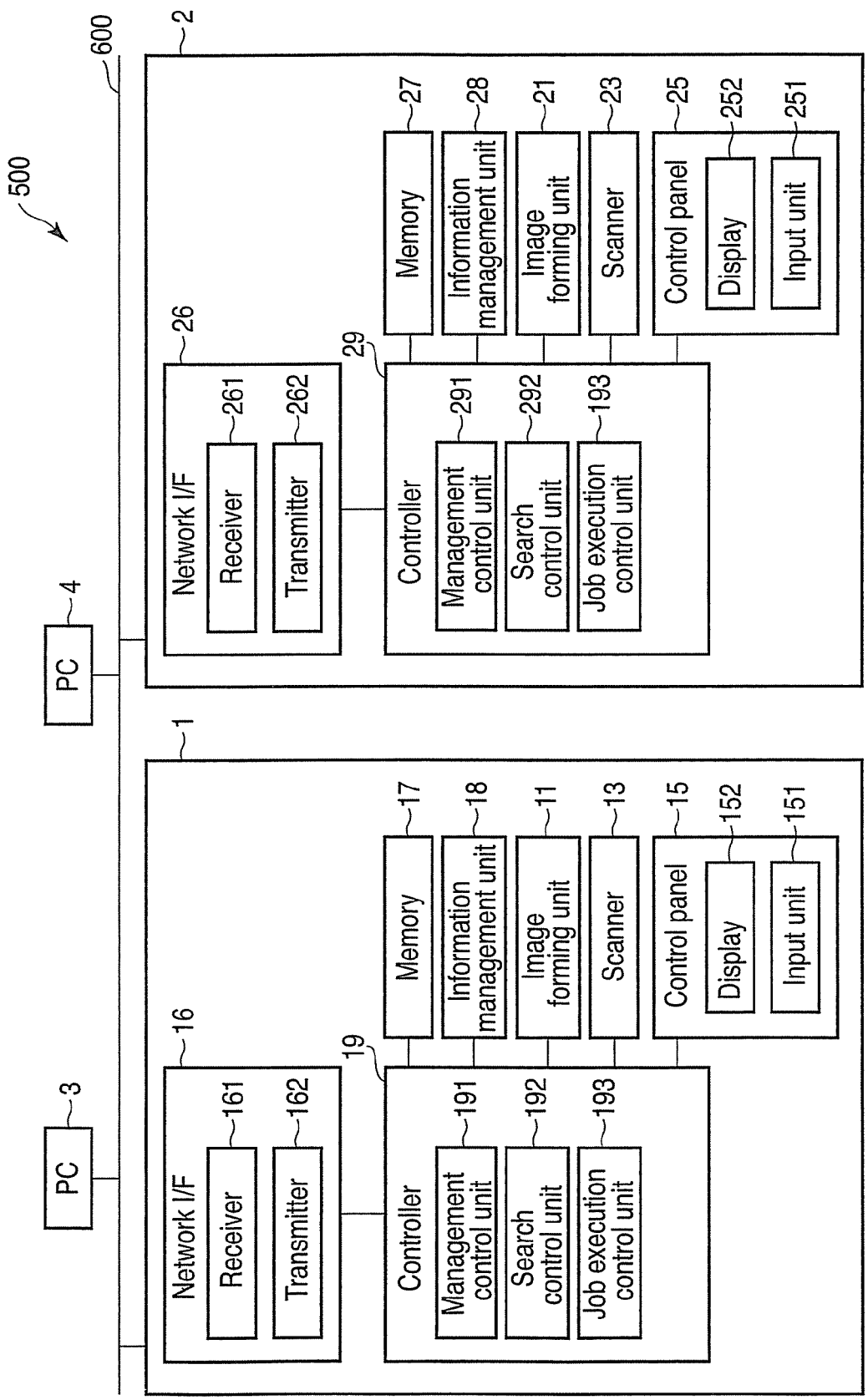
FIG. 2 is an exemplary view showing a network system including plural MFPs in the embodiment.

In general, according to an embodiment, a linkage system of plural multi function peripherals includes a first multi function peripheral and a second multi function peripheral. The first multi function peripheral includes a first network interface, a first memory and a first management unit. The first memory is configured to store a first data group. The first management unit is configured to manage first management information relating to the first data group. The second multi function peripheral includes a second network interface, a second memory, a second management unit and a control unit. The second memory is configured to store a second data group. The second management unit is configured to manage second management information relating to the second data group. The control unit is configured to link the first management information and the second management information.

Hereinafter, an embodiment will be described with reference to the drawings. FIG. 1 is a perspective view showing an outer appearance of an MFP 1 in the embodiment. The MFP 1 is, for example, a four-tandem color copier. The MFP 1 includes an image forming unit 11, a cassette 12, a scanner 13, an auto document feeder 14 and a control panel 15. The image forming unit 11 prints image information on a sheet and outputs it. The cassette 12 contains a sheet of an arbitrary size used for printing in the image forming unit 11. The scanner 13 captures image information of a document as data. The auto document feeder 15 is provided to be capable of opening and closing with respect to the scanner 14. After the reading of the image information of the document by the scanner 14 is ended, the auto document feeder 15 discharges the document from the read position to the discharge position, and guides a next document to the read position. The control panel 16 has an input function to enable necessary information to be inputted and a display function to display various information.

FIG. 2 is a block diagram of a network system 500 including plural MFPs in the embodiment. The network system 500 includes an MFP 1 (first multi function peripheral), an MFP 2 (second multi function peripheral), a PC 3 and a PC 4. These equipments are connected to each other on a network 600 constituted by a LAN or the like in such a manner that bidirectional communication of data can be performed in the network 500. Although FIG. 2 shows the two MFPs and the two PCs, the number of these included in the network system 500 is not limited to this.

FIG. 2 is the block diagram showing the control system of the MFP 1 in the embodiment. The MFP 1 includes a network I/F 16, a memory 17, an information management unit 18 and a controller 19 in addition to the image forming unit 11, the scanner 13 and the control panel 15 described before. The control panel 15 includes an input unit 151 of a touch panel in which necessary information can be inputted, and a display 152 of a liquid crystal monitor to display various information. The network I/F 16 connects the MFP 1 to the network 600. The receiver 161 receives data from another apparatus in the network system 500. The transmitter 162 transmits data to another apparatus in the network system 500. The memory 17 stores various data such as an address book and a document (file or image data). As an example, the address book stored in the memory 17 is the data inputted by the user through the input unit 151. As an example, the document stored in the memory 17 is the data obtained in such a manner that the user selects a scan to file function by the input unit 151 and the scanner 13 scans. The document may be obtained by a print function or a FAX function of the MFP 1 based on an instruction from the PC 3.

The information management unit 18 stores user management information (user management list) in which information (hereinafter referred to as user ID) to specify the user having the authority of using the MFP 1 is correlated with a password uniquely set for each user ID. Further, the information management unit 18 stores address book management information (address management list) in which an address book ID attached to the address book stored in the memory 17 is correlated with the user ID inputted by the user through the input unit 151 at the time of setting the address book. Incidentally, the information management unit 18 may store template management information (template management list) in which a template ID attached to a template stored in the memory 17 is correlated with the user ID inputted by the user through the input unit 151 at the time of setting the template. Similarly, the information management unit (BOX folder) 18 stores document management information (document management list) in which a document ID attached to each document included in a document group stored in the memory 17 is correlated with the user ID inputted by the user through the input unit 151 at the time of selecting the scan to file function for the document. Further, the information management unit 18 stores queue management information (queue management list) relating to various queues in the MFP 1. The controller 19 controls the operations of respective units of the MFP 1. Further, the controller 19 includes a management control unit 191, a search control unit 192 and a job execution control unit 193.

The management control unit 191 executes a remote procedure call to another MFP (MFP 2 in this embodiment) on the network 600. The management control unit 191 links user management information, address book management information, template management information, document management information, queue management information and the like stored in the MFP 2. Further, the management control unit 191 can acquire necessary information from the user management information, the address book management information, the template management information, the document management information, the queue management information and the like stored in the MFP 2.

Figure 3:
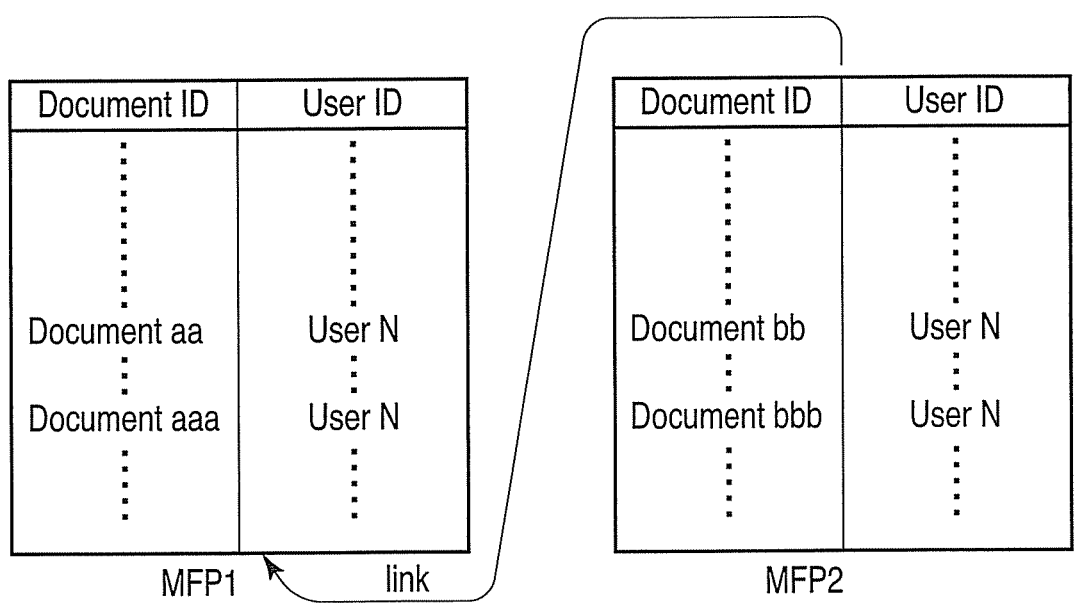
FIG. 3 is an exemplary conceptual view showing a link between plural MFPs in the embodiment.

FIG. 3 is a conceptual view showing a link, which is achieved by the management control unit 191, between the document management information (first document management information) stored in the MFP 1 and the document management information (second document management information) stored in the MFP 2. The management control unit 191 links, as a queue, the first document management information and the second document management information through the network 600. Here, although the description is made on the structure in which the MFP 1 links the first document management information and the second document management information, the reverse is the same. Incidentally, the management control unit 191 may acquire all the second document management information from the MFP 2, store it in the information management unit 18, and link it to the first document management information.

Further, conversely, the management control unit 191 receives a remote procedure call from the MFP 2. The management control unit 191 transmits the information of an acquisition request object among the user management information, the address book management information, the template management information, the document management information, the queue management information and the like stored in the MFP 1 to the MFP 2 in response to the acquisition request from the MFP 2.

The search control unit 192 searches an equipment existing (effectively connected) on the network 600. The search control unit 192 executes the remote procedure call, and searches the equipment existing on the network 600. Incidentally, when all equipments (IP addresses assigned to the respective equipments, etc.) connected on the network 600 are previously registered in the search control unit 192, the search control unit 192 can efficiently search the equipments existing on the network 600.

When the user designates a document on a queue or management by the input unit 151 or the PC 3 and designates the execution of a job in the MFP 1, the job execution control unit 193 controls the respective units to execute the designated job. When the user designates a document on a queue or management and designates the execution of a job in the MFP 2, the job execution control unit 193 executes a remote procedure call, and can designate the execution instruction of the designated job in the MFP 2 through the network 600. The job execution control unit 193 can receive the execution instruction of a job from equipments (for example, the MFP 2, the PC 3, the PC 4) on the network 600 by the remote procedure call. That is, the job execution control unit 193 can treat the designation of the job execution instruction to another equipment and the reception of the job execution instruction from another equipment by the remote procedure call similarly to the local process (process in the MFP 1).

Next, the structure of the MFP 2 will be described. The outer appearance of the MFP 2 is similar to the MFP 1 shown in FIG. 1. The MFP 2 includes an image forming unit 21, a scanner 23, a control panel 25, a network I/F 26, a memory 27, an information management unit 28 and a controller 29. The image forming unit 21, the scanner 23, the control panel 25, the network I/F 26, the memory 27, the information management unit 28 and the controller 29 respectively may have the same structures as the image forming unit 11, the scanner 13, the control panel 15, the network I/F 16, the memory 17, the information management unit 18 and the controller 19.

Further, the control panel 25 includes an input unit 251 and a display 252. The network I/F 26 includes a receiver 261 and a transmitter 262. The controller 29 includes a management control unit 291, a search control unit 292 and a job execution control unit 293. The input unit 251, the display 252, the receiver 261, the transmitter 262, the management control unit 291, the search control unit 292 and the job execution control unit 293 respectively may have the same structures as the input unit 151, the display 152, the receiver 161, the transmitter 162, the management control unit 191, the search control unit 192 and the job execution control unit 193.

Next, the execution instruction of private print in the MFP 2 will be described with reference to a flowchart shown in FIG. 4. The private print is the print executed by the MFP 2 when the user who executes the private print selects a document attached with a document ID correlated with his/her own user ID. First, the job execution control unit 293 detects the input of a job by the user through the input unit 251 (Act 101). The job execution control unit 293 determines whether the private print is selected (Act 102). When the private print is not selected (Act 102, No), the job execution control unit 293 returns to Act 101 and waits for the input of the job by the user through the input unit 251.

When the private print is selected (Act 102, Yes), the job execution control unit 293 controls to display a screen to request for input of a user ID and a password on the display 252. Thereafter, the job execution control unit 293 authenticates the inputted user ID and the password (Act 103). When the user ID is not authenticated (Act 103, No), the job execution control unit 293 is on standby until the correct user ID and the password are inputted.

When the user ID is authenticated (Act 103, Yes), the job execution control unit 293 extracts information relating to the inputted user ID from the second document management information, and controls to display it on the display 152 (Act 104). The search control unit 292 determines whether another MFP exists on the network 600 (Act 105). When another MFP (here, the MFP 1) exists on the network 600 (Act 105, Yes), the management control unit 291 extracts information relating to the inputted user ID from the first document management information and acquires it (Act 106).

The job execution control unit 293 controls to display third document management information (third list), which is generated by combining the first document management information (first list) relating to the inputted user ID and the second document management information (second list) relating to the inputted user ID, on the display 252 (Act 107). When another MFP (here, the MFP 1) does not exist on the network 600 (Act 105, No), the job execution control unit 293 controls to display the second document management information, which relates to the inputted user ID and is stored in the MFP 2, as it is (Act 107).

Figure 5:
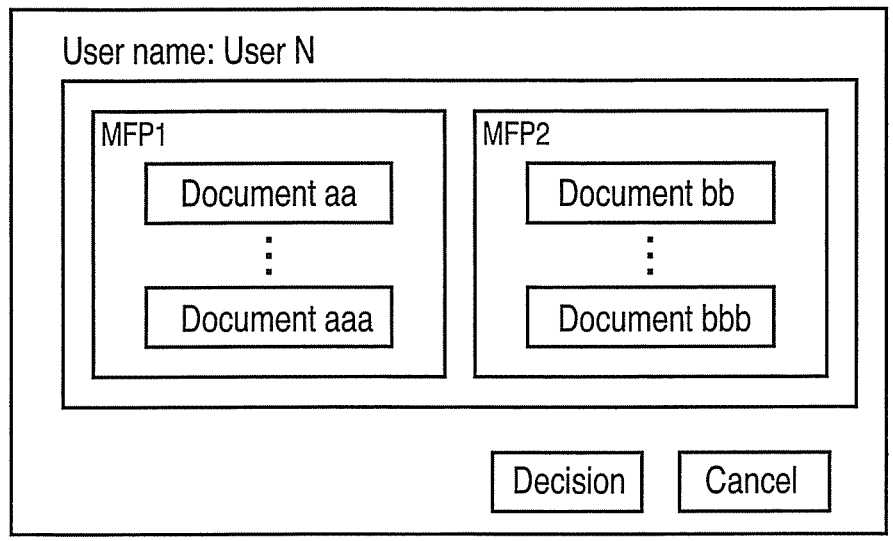
FIG. 5 is an exemplary view of a display screen of document management information in the embodiment.

FIG. 5 shows an example of a display screen of the third document management information controlled to display on the display 252 by the job execution control unit 293 at Act 107. Here, it is assumed that the user N inputs user N as the user ID by the input unit 251, and the job execution control unit 293 authenticates the inputted user ID and the password at Act 103. The display 252 divides the document management information stored in MFPs on the network 600 by each of the MFPs and displays it. Accordingly, the user N can select a desired document as an object of the private print by the input unit 251 irrespective of the storage destination of the document.

The job execution control unit 293 determines whether a document is selected from the third document management information displayed on the display 252 (Act 108). When a document is selected (Act 108, Yes), the job execution control unit 293 transmits a print queue to the MFP storing the selected document (Act 109). When no document is selected (Act 108, No), the job execution control unit 293 ends the execution of the private print.

At Act 109, when the selected document is included in the second document management information, the job execution control unit 293 controls so that the document of the private print object stored in the memory 27 is printed on a sheet by the image forming unit 21.

At Act 109, when the selected document is included in the first document management information, the job execution control unit 293 transmits a print queue (print instruction) to the MFP 1 through the network I/F 26. In the MFP 1, the job execution control unit 193 receives the print queue through the network I/F 16. The job execution control unit 193 controls so that the document of the private print object stored in the memory 17 is printed on a sheet by the image forming unit 11.

Incidentally, at Act 109, when the selected document is included in the first document management information, the job execution control unit 293 may acquire the document of the private print object stored in the memory 17 of the MFP 1 through the network I/F 26. The job execution control unit 293 controls so that the document of the print object acquired from the MFP 1 is printed on the sheet by the image forming unit 21.

Incidentally, although the job execution control unit 293 displays and controls the second document management information relating to the inputted user ID on the display 252 at Act 104, the operation here may be skipped.

Figure 4:
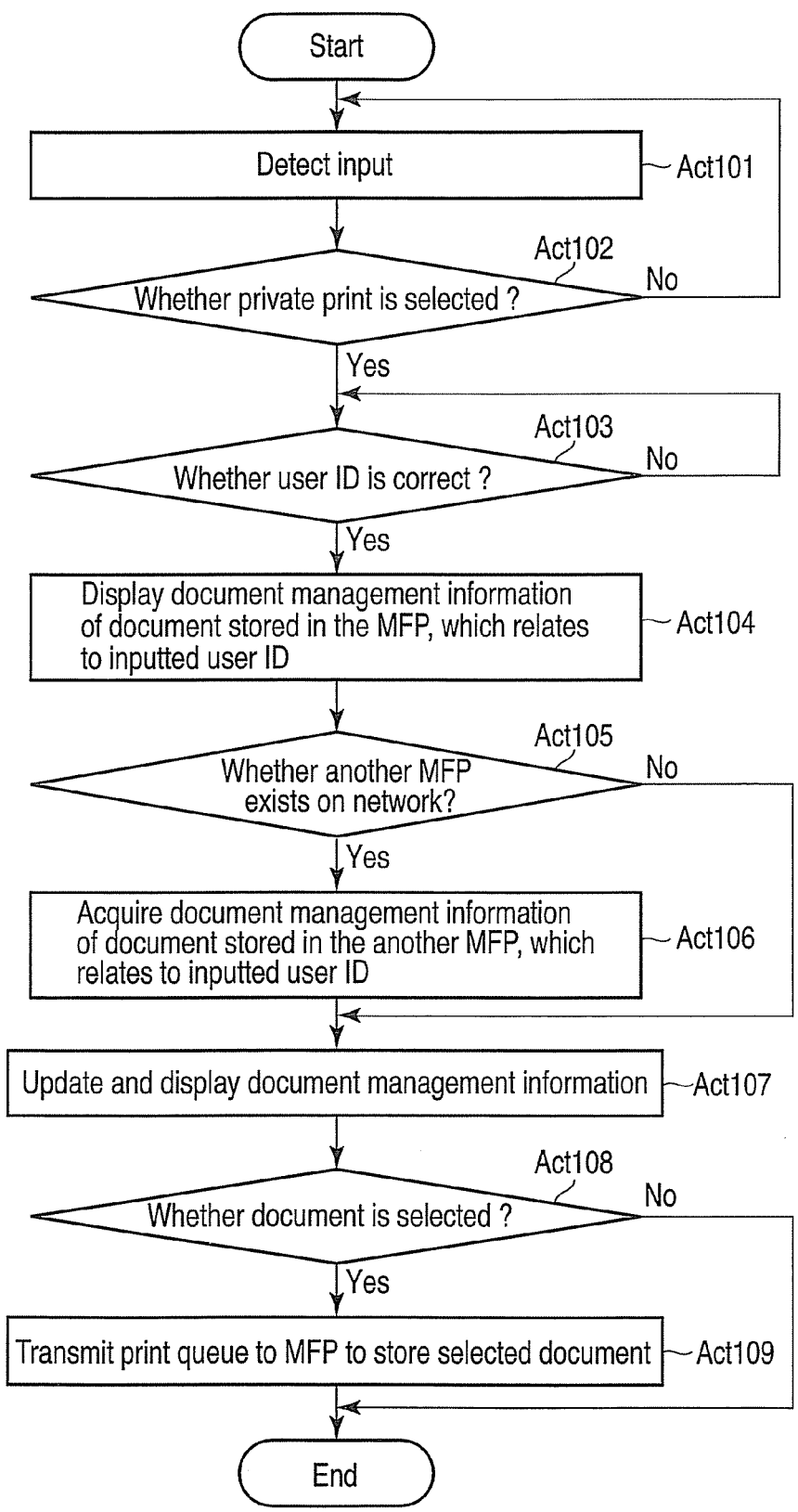
FIG. 4 is an exemplary flowchart showing a printing operation of the MFP in the embodiment.

At Act 101 in FIG. 4, although the description is made on the example in which the user inputs the job by the input unit 251 of the MFP 2, the same applies to the case where the job is inputted by using the PC 3. Besides, at Act 106 in FIG. 4, after the user selects the private print by the input unit 251, the management control unit 291 executes the remote procedure call to the MFP 1 in order to link the second document management information and the first document management information, however, no limitation is made to this. For example, the search control unit 292 executes the remote procedure call at the time of activation of the MFP 2 to confirm the existence (activation) of the MFP 1 on the network 600, and the management control unit 291 may link the mutual document management information.

Besides, the search control unit 292 executes the remote procedure call at regular time intervals to confirm the existence (activation) of the MFP 1 on the network 600, and the management control unit 291 may update the link of the mutual document management information. The update here means keeping the link. Further, the search control unit 292 executes the remote procedure call at regular time intervals to confirm the non-existence (power off) of the MFP 1 on the network 600, and the management control unit 291 may update the link of mutual document management information. The update here means the end (invalidity) of the link. Further, when the search control unit 292 receives activation notification notified from the MFP when the MFP 1 is activated, the management control unit 291 executes the remote procedure call, and may update the link of the mutual document management information. The update here means the start (validity) of the link.

Figure 6:
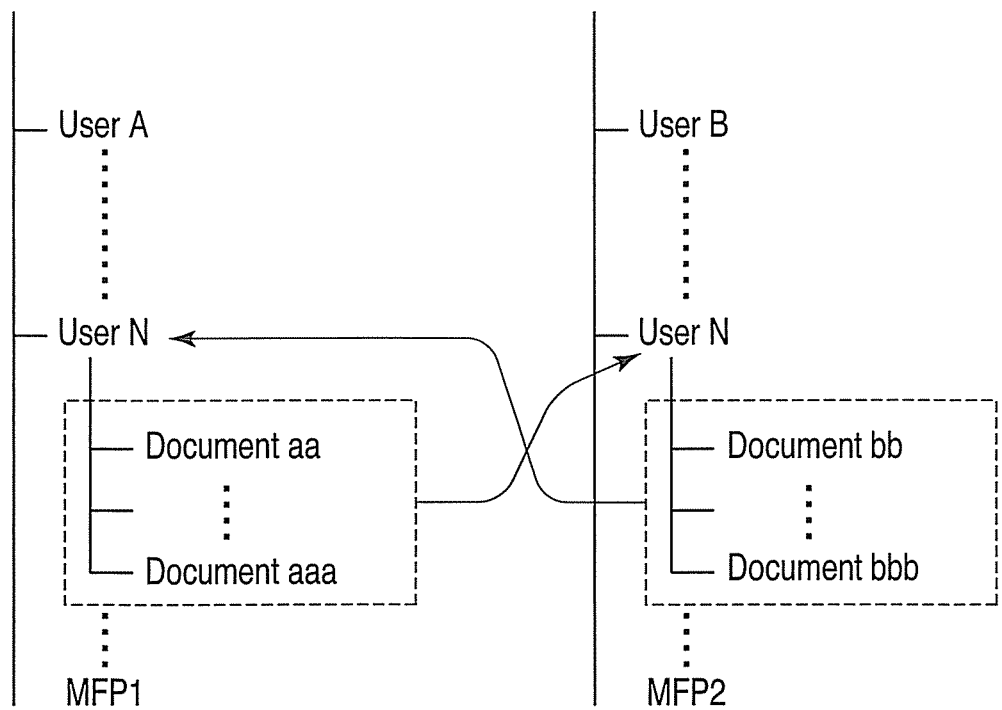
FIG. 6 is an exemplary conceptual view showing a mount link between plural MFPs in the embodiment.

Incidentally, although FIG. 3 shows the example of the structure in which the first document management information and the second document management information are linked, no limitation is made to this. For example, FIG. 6 is a conceptual view showing a mount link of the second document management information and the first document management information by the management control unit 291. The management control unit 291 has a remote mount link function between apparatuses through the network 600. By the remote mount link function, the management control unit 291 regards the first document management information as being stored by the MFP 2, and can treat it similarly to the second document management information. Accordingly, the management control unit 291 combines the second document management information and the first document management information, and correlates the user ID with the document ID. For example, the management control unit 291 correlates the document ID correlated with the user N included in the first document management information in addition to the document ID correlated with the user N included in the second document management information, with the user N.

Incidentally, the management control unit 291 is set to activate the remote mount link function at the time of activation of the MFP 2. As described above, the timing when the management control unit 291 activates the remote mount link function may be an arbitrary timing when the search control unit 292 confirms the existence (activation) of the MFP 1 on the network 600. Incidentally, the management control unit 291 acquires the first document management information from the MFP 1 and stores the first document management information in the information management unit 28. the management control unit 291 may mount and link the first document management information with the second document management information. Here, although the description is made on the structure in which the MFP 2 mounts and links the second document management information and the first document management information, the reverse is the same.

Further, the information management unit 18 (or the information management unit 28) can mange the management information of users, groups, deunitments and the like stored in the memory 17 (or the memory 27) and the roll information given to the users, the groups, the departments and the like. For example, when the administrator displays a user list through the control panel 15 of the MFP 1, the user information stored and managed in the information management unit 28 of the MFP 2 is acquired through the management control unit 191, is linked to the user information managed in the MFP 1, and is displayed on the display 152. Besides, when a user is added or deleted, the user information is linked through the management control unit 191, and the addition or deletion of the data of the user can be executed from the information management unit 28 of the MFP 2. As described above, when a data update is requested, the management control unit confirms the consistency of the data by the synchronization function with the management control unit of another MFP and updates the data. In this case, when a new MFP is added to the network, an apparatus name (address) is added to the management control unit 191 of the synchronizing MFP, and the MFP becomes the synchronization object from the time of next update.

Incidentally, a not-shown apparatus group management unit 191 in the controller can manage selection of an apparatus to be linked. The administrator sets an apparatus group name or an address to each of objective apparatuses. The apparatus group management unit searches machines of the same apparatus group as the apparatus itself, and sets the machines in an apparatus group table. By this, the management control unit acquires synchronization object apparatuses on the network and can establish synchronization.

As described above, data is shared among the plural apparatuses, and when management information of users, groups, departments and the like and roll information are inputted and edited in one apparatus, the other apparatus can refer to and use the updated information.

According to this embodiment, not only the document management information relating to the document stored in its own MFP, but also the document management information relating to the document and the like stored in another MFP on the network 600 is acquired, and the information substance such as the document can be handled. Accordingly, even if the user does not operate plural MFPs on the network 600, the user operates one MFP and can operate a document or the like stored in the other MFP.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A linkage system of a plurality of multi function peripherals, comprising:
a first multi function peripheral including
a first network interface,
a first memory configured to store a first data group, to correlate a first document group with a user ID and to store the first document group, and
a first management unit configured to manage first management information relating to the first data group; and
a second multi function peripheral including
an input unit configured to input a user ID at a time of a print request,
a printer,
a second network interface,
a second memory configured to store a second data group,
a second management unit configured to manage second management information relating to the second data group,
a control unit configured to link the first management information and the second management information, to create a third list by acquiring and combining a first list and a second list corresponding to the user ID inputted in the input unit, to control to print a document of a print object included in the second memory by the printer based on the print request for a document included in the second list part of the third list, and to transmit the print request to the first multi function peripheral through the second network interface based on the print request for a document included in the first list part of the third list, and
a display configured to display the third list.

2. The system of claim 1, wherein the first multi function peripheral includes a printer configured to print a document of a print object.

3. The system of claim 1, wherein the control unit acquires a document of a print object included in the first memory through the second interface based on the print request for a document included in the first list.

4. The system of claim 1, wherein when activation of the first multi function peripheral is detected, the control unit validates the link between the first management information and the second management information.

5. The system of claim 1, wherein when power-off of the first multi function peripheral is detected, the control unit invalidates the link between the first management information and the second management information.

6. A linkage method of a plurality of multi function peripherals in a system that includes:
a first multi function peripheral including a first network interface, a first memory configured to store a first data group, to correlate a first document group with a user ID and to store the first document group, and a first management unit configured to manage first management information relating to the first data group; and
a second multi function peripheral including an input unit configured to input a user ID at a time of a print request, a printer, a second network interface, a second memory configured to store a second data group, to correlate a second document group with a user ID and to store the second document group, and a second management unit configured to manage second management information relating to the second data group, the method comprising:
searching the first multi function peripheral through a network by the second multi function peripheral;
linking the first management information and the second management information if the first multi function peripheral exists on the network;
creating a third list by acquiring and combining a first list and a second list corresponding to the user ID inputted in the input unit;
controlling to print a document of a print object included in the second memory by the printer based on the print request for a document included in the second list part of the third list; and
transmitting the print request to the first multi function peripheral through the second network interface based on the print request for a document included in the first list part of the third list.

* * * * *

UNITED STATES PATENT AND TRADEMARK OFFICE
CERTIFICATE OF CORRECTION

PATENT NO. : 8,531,690 B2
APPLICATION NO. : 12/986380
DATED : September 10, 2013
INVENTOR(S) : Toshiharu Takahashi It is certified that error appears in the above-identified patent and that said Letters Patent is hereby corrected as shown below:

On the Title Page, item (73) Assignees:

Toshiba Tec Kabushiki Kaisha, Tokyo (JP)

Should read:

(73) Assignees:

Kabushiki Kaisha Toshiba, Tokyo (JP)
Toshiba Tec Kabushiki Kaisha, Tokyo (JP)

Signed and Sealed this
Thirteenth Day of May, 2014

Michelle K. Lee
*Deputy Director of the United States Patent and Trademark Office*